(12) United States Patent
Chow

(10) Patent No.: US 8,473,966 B2
(45) Date of Patent: Jun. 25, 2013

(54) ITERATIVE EXCHANGE COMMUNICATION

(75) Inventor: Edmond Chow, Brooklyn, NY (US)

(73) Assignee: D.E. Shaw Research, LLC, New York, NY (US)

( * ) Notice: Subject to any disclaimer, the term of this patent is extended or adjusted under 35 U.S.C. 154(b) by 1340 days.

(21) Appl. No.: 11/865,322

(22) Filed: Oct. 1, 2007

(65) Prior Publication Data

US 2008/0082988 A1    Apr. 3, 2008

Related U.S. Application Data

(60) Provisional application No. 60/827,558, filed on Sep. 29, 2006.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |

(52) U.S. Cl.
USPC ............................. 719/313; 719/312; 719/314

(58) Field of Classification Search
USPC ................................... 719/312–314; 709/250
See application file for complete search history.

(56) References Cited

U.S. PATENT DOCUMENTS

| | | | | |
|---|---|---|---|---|
| 5,617,537 | A * | 4/1997 | Yamada et al. | 709/214 |
| 6,256,677 | B1 * | 7/2001 | Pribnow et al. | 709/250 |
| 6,336,145 | B2 * | 1/2002 | Kim | 709/250 |
| 6,408,341 | B1 * | 6/2002 | Feeney et al. | 709/250 |
| 6,687,702 | B2 * | 2/2004 | Vaitheeswaran et al. | 1/1 |
| 7,124,211 | B2 * | 10/2006 | Dickson et al. | 710/22 |
| 7,197,571 | B2 * | 3/2007 | Sarkar et al. | 709/237 |
| 7,421,700 | B2 * | 9/2008 | Meleshchuk | 719/313 |
| 7,539,989 | B2 * | 5/2009 | Blackmore et al. | 718/100 |
| 2008/0034054 | A1 * | 2/2008 | Stehley et al. | 709/213 |

OTHER PUBLICATIONS

G. Almasi, C. Archer, J. G. Castanos, et al., Design and Implementation of Message-Passing Services for the Blue Gene/L Supercomputer, *IBM J. Res. & Dev.*, 49(2-3): 393-406, 2005.
I. T. Arkin, H. Xu, K. J. Bowers, et al., Mechanism of a Na+/H+ Antiporter, submitted, 2006.
K. J. Bowers, Speed Optimal Implementation of a Fully Relativistic 3D Particle Push with a Charge Conserving Current Accumulate on Modern Processors, presented at 18th International Conference on the Numerical Simulation of Plasmas, Cape Cod, MA, 2003.

(Continued)

*Primary Examiner* — Diem Cao
(74) *Attorney, Agent, or Firm* — Occhiuti Rohlicek & Tsao LLP

(57) ABSTRACT

An inter-processor communication approach is applicable to a message passing pattern called iterative exchange. In such patterns, two processors exchange messages, then perform a computation, and then this process is repeated. If two sets of send and receive buffers are used, then it is possible to guarantee that a receive buffer on the receiver's side is always available to receive the message. A message passing system controls which buffers are used for sending and receiving. These buffers are registered beforehand, thereby avoiding repeated registration at the time messages are sent. The sender is initially informed of all the possible receive buffers that the receiver will use, and the sender then uses these receive buffers alternately. Examples of this approach can avoid the use of multiple-step rendezvous protocols, memory copies, and memory registrations when a message needs to be sent.

15 Claims, 3 Drawing Sheets

OTHER PUBLICATIONS

K. J. Bowers, R. O. Dror, and D. E. Shaw, Overview of Neutral Territory Methods for the Parallel Evaluation of Pairwise Particle Interactions, *J. Phys. Conf. Ser.*, 16: 300-304, 2005.

K. J. Bowers, R. O. Dror, and D. E. Shaw, The Midpoint Method for Parallelization of Particle Simulations, *J. Chem. Phys.*, 124: 184109, 2006.

K. J. Bowers, R. O. Dror, and D. E. Shaw, Zonal Methods for the Parallel Execution of Range-Limited N-Body Problems, in press, *J. Comput. Phys.*, 2006.

B. R. Brooks, R. E. Bruccoleri, B. D. Olafson, et al., CHARMM: A Program for Macromolecular Energy, Minimization, and Dynamics Calculations, *J. Comput. Chem.*, 4: 187-217, 1983.

C. L. Brooks, B. M. Pettit, and M. Karplus, Structural and Energetic Effects of Truncating Long Ranged Interactions in Ionic and Polar Fluids, *J. Chem. Phys.*, 83(11): 5897-5908, 1985.

F. Cappello and D. Etiemble, MPI Versus MPI+OpenMP on the IBM SP for the NAS Benchmarks, presented at ACM/IEEE SC2000 Conference, Dallas, TX, 2000.

D. A. Case, T. E. Cheatham, III, T. Darden, et al., The Amber Biomolecular Simulation Programs, *J. Comput. Chem.*, 26(16): 1668-1688, 2005.

E. Chow and D. Hysom, Assessing Performance of Hybrid MPI/OpenMP Programs on SMP Clusters, Lawrence Livermore National Laboratory UCRL-JC-143957, 2001.

T. Darden, D. York, and L. Pedersen, Particle Mesh Ewald: An N Log(N) Method for Ewald Sums in Large Systems, *J. Chem. Phys.*, 98(12): 10089-10092, 1993.

Y. Duan and P. A. Kollman, Pathways to a Protein Folding Intermediate Observed in a 1-Microsecond Simulation in Aqueous Solution, *Science*, 282(5389): 740-744, 1998.

M. Eleftheriou, B. G. Fitch, A. Rayshubskiy, et al., Scalable Framework for 3D FFTs on the Blue Gene/L Supercomputer: Implementation and Early Performance Measurements, *IBM J. Res. & Dev.*, 49(2-3): 457-464, 2005.

B. G. Fitch, A. Rayshubskiy, M. Eleftheriou, et al., Blue Matter: Strong Scaling of Molecular Dynamics on Blue Gene/L, IBM RC23888, Feb. 22, 2006.

B. G. Fitch, A. Rayshubskiy, M. Eleftheriou, et al., Blue Matter: Approaching the Limits of Concurrency for Classical Molecular Dynamics, IBM RC23956, May 12, 2006.

B. G. Fitch, A. Rayshubskiy, M. Eleftheriou, et al., Blue Matter: Strong Scaling of Molecular Dynamics on Blue Gene/L, IBM RC23688, Aug. 5, 2005.

M. Frigo and S. G. Johnson, The Design and Implementation of FFTW3, *Proceedings of the IEEE*, 93(2): 216-231, 2005.

R. S. Germain, B. Fitch, A. Rayshubskiy, et al., Blue Matter on Blue Gene/L: Massively Parallel Computation for Biomolecular Simulation, presented at 3rd IEEE/ACM/IFIP international conference on Hardware/software codesign and system synthesis (CODES+ISSS '05), New York, NY, 2005.

T. A. Halgren, MMFF VII. Characterization of MMFF94, MMFF94s, and Other Widely Available Force Fields for Conformational Energies and for Intermolecular-Interaction Energies and Geometries, *J. Comput. Chem.*, 20(7): 730-748, 1999.

G. S. Heffelfinger, Parallel Atomistic Simulations, *Comput. Phys. Commun.*, 128(1-2): 219-237, 2000.

W. L. Jorgensen, D. S. Maxwell, and J. Tirado-Rives, Development and Testing of the OPLS All-Atom Force Field on Conformational Energetics and Properties of Organic Liquids, *J. Am. Chem. Soc.*, 118(45): 11225-11236, 1996.

S. Kumar, G. Almasi, C. Huang, et al., Achieving Strong Scaling with NAMD on Blue Gene/L, presented at IEEE International Parallel & Distributed Processing Symposium, Rhodes Island, Greece, 2006.

J. Liu, J. Wu, and D. K. Panda, High Performance RDMABased MPI Implementation over InfiniBand, presented at 17th International Conference on Supercomputing, San Francisco, CA, 2003.

J. MacKerell, A. D., D. Bashford, M. Bellott, et al., All-Atom Empirical Potential for Molecular Modeling and Dynamics Studies of Proteins, *J. Phys. Chem. B*, 102(18): 3586-3616, 1998.

P. Mark and L. Nilsson, Structure and Dynamics of Liquid Water with Different Long-Range Interaction Truncation and Temperature Control Methods in Molecular Dynamics Simulations, *J. Comput. Chem.*, 23(13): 1211-1219, 2002.

Mellanox Technologies, Mellanox IB-Verbs API (VAPI): Mellanox Software Programmer's Interface for InfiniBand Verbs, 2001.

Narumi, A. Kawai, and T. Koishi, An 8.6,1 Tflop/s Molecular Dynamics Simulation for NaCl with a Special-Purpose Computer: MDM, presented at ACM/IEEE SC2001 Conference, Denver, Colorado, 2001.

J. Norberg and L. Nilsson, On the Truncation of Long-Range Electrostatic Interactions in DNA, *Biophys. J.*, 79(3): 1537-1553, 2000.

V. S. Pande, I. Baker, J. Chapman, et al., Atomistic Protein Folding Simulations on the Submillisecond Time Scale Using Worldwide Distributed Computing, *Biopolymers*, 68(1): 91-109, 2003.

P. M. Papadopoulos, M. J. Katz, and G. Bruno, NPACI Rocks: Tools and Techniques for Easily Deploying Manageable Linux Clusters, *Concurrency Comput. Pract. Ex.*, 15(7-8): 707-725, 2003.

M. Patra, M. Karttunen, T. Hyvönen, et al., Molecular Dynamics Simulations of Lipid Bilayers: Major Artifacts Due to Truncating Electrostatic Interactions, *Biophys. J.*, 84: 3636-3645, 2003.

J. C. Phillips, R. Braun, W. Wang, et al., Scalable Molecular Dynamics with NAMD, *J. Comput. Chem.*, 26(16): 1781-1802, 2005.

J. C. Phillips, G. Zheng, S. Kumar, et al., NAMD: Biomolecular Simulation on Thousands of Processors, presented at ACM/IEEE SC2002 Conference, Baltimore, 2002.

S. Plimpton, Fast Parallel Algorithms for Short-Range Molecular-Dynamics, *J. Comput. Phys.*, 117(1): 1-19, 1995.

S. Plimpton and B. Hendrickson, Parallel Molecular-Dynamics Simulations of Organic Materials, *Int. J. Mod. Phys. C.*, 5(2): 295-298, 1994.

S. Plimpton and B. Hendrickson, A New Parallel Method for Molecular Dynamics Simulation of Macromolecular Systems, *J. Comput. Chem.*, 17(3): 326-337, 1996.

W. R. P. Scott, P. H. Hünenberger, I. G. Tironi, et al., The GROMOS Biomolecular Simulation Program Package, *J. Phys. Chem. A*, 103(19): 3596-3607, 1999.

M. M. Seibert, A. Patriksson, B. Hess, et al., Reproducible Polypeptide Folding and Structure Prediction Using Molecular Dynamics Simulations, *J. Mol. Biol.*, 354(1): 173-183, 2005.

Y. Shan, J. L. Klepeis, M. P. Eastwood, et al., Gaussian Split Ewald: A Fast Ewald Mesh Method for Molecular Simulation, *J. Chem. Phys.*, 122: 054101, 2005.

D. E. Shaw, A Fast, Scalable Method for the Parallel Evaluation of Distance-Limited Pairwise Particle Interactions, *J. Comput. Chem.*, 26(13): 1318-1328, 2005.

M. Snir, A Note on N-Body Computations with Cutoffs, *Theor. Comput. Syst.*, 37: 295-318, 2004.

D. van der Spoel, E. Lindahl, B. Hess, et al., GROMACS: Fast, Flexible, and Free, *Journal of Computational Chemistry*, 26(16): 1701-1718, 2005.

M. Taiji, T. Narumi, Y. Ohno, et al., Protein Explorer: A Petaflops Special-Purpose Computer System for Molecular Dynamics Simulations, presented at ACM/IEEE SC2003 Conference, Phoenix, Arizona, 2003.

R. Zhou and B. J. Berne, A New Molecular Dynamics Method Combining the Reference System Propagator Algorithm with a Fast Multipole Method for Simulating Proteins and Other Complex Systems, *J. Chem. Phys.*, 103(21): 9444-9459, 1995.

R. Zhou, E. Harder, H. Xu, et al., Efficient Multiple Time Step Method for Use with Ewald and Particle Mesh Ewald for Large Biomolecular Systems, *J. Chem. Phys.*, 115(5): 2348-2358, 2001.

P. Wyckoff and J. Wu, "Memory Registration Caching Correctness," IEEE International Symposium on Cluster Computing and the Grid, 2005.

J Liu et al., "Design and Implementation of MPICH2 over IniniBand with RDMA Support," Proceedings of the 18th International Parallel and Distributed Processing Symposium (IPDPS'04), 2004 IEEE.

\* cited by examiner

ITERATIVE EXCHANGE COMMUNICATION

CROSS-REFERENCE TO RELATED APPLICATIONS

This application claims the benefit of U.S. Provisional Application No. 60/827,558, filed on Sep. 29, 2006, titled "Iterative Exchange Communication," which is incorporated herein by reference.

This application is also related to PCT Application No. PCT/US2006/032498, titled "ARCHITECTURES FOR COMPUTATION OF PARTICLE INTERACTIONS," filed on Aug. 18, 2006, which is incorporated herein by reference.

BACKGROUND

This invention relates to a communication approach.

In a distributed computing system, such as in a distributed memory parallel computer system, messages may be sent from one processor (the sender) to another (the receiver) so that they can work cooperatively to solve a computational problem. The processors are connected, for example, via a communication network. In general, the problem can be solved more quickly if messages can be sent and received more quickly or otherwise transferred in a way that reduces the amount of time processors are idle waiting for messages. Communication via sending and receiving messages is called message passing.

Implementations of message passing systems can face a number of technical constraints which, depending on the implementation, can reduce the efficiency of the system. These technical constraints can include:
1) the sender must make sure that the receiver has memory to receive the message
2) the sender must know where to put the message on the receiver's side
3) memory for the message's send buffer (on the sender's side) and receive buffer (on the receiver's side) must be registered, which can be a costly process.

One approach to addressing the first two constraints involves a rendezvous protocol. In such a protocol, the sender first sends a short "request" message. (The message is short and uses reserved space on the receiver's side.) The receiver responds with a short "reply" message containing the address of the receive buffer after the receiver is ready to receive the message. Finally, the sender sends the actual message. It is desirable to avoid using a rendezvous protocol since the overhead involved in the initial request and reply exchange can render it less efficient than sending a message directly.

To address the third technical constraint, the message passing system can keep track of what send and receive buffers have been registered. Further messages using these buffers do not need to be re-registered, thus saving the memory registration cost. Messages using buffers that have not been registered still need to be registered.

Another approach to addressing the third constraint can be used when the messages are short. The message passing system reserves several send and receive buffers and registers them. A short message is copied into one of these pre-registered buffers and sent to another pre-registered buffer on the receiver's side. The message is then copied to the receiver's actual message destination. The overhead associated with copying the message to its actual destination can render this approach less efficient that transferring the message directly into its actual destination. Therefore, this mechanism is generally most applicable to short messages. The approach can also suffer from the possibility that reserved buffers may run out.

SUMMARY

In one aspect, in general, the first constraint is addressed for a message passing pattern called iterative exchange. In such patterns, two processors exchange messages, then perform a computation, and then this process is repeated. If two sets of send and receive buffers are used, then it is possible to guarantee that a receive buffer on the receiver's side is always available to receive the message.

In another aspect, in general, the second and third constraints are addressed by a message passing system that controls which buffers are used for sending and receiving. These buffers are registered beforehand. Therefore, no memory registrations needs to happen at the time messages are sent. The second constraint is addressed by telling the sender all the possible receive buffers that the receiver will use, and agreeing that the receive buffers will be used alternately.

In another aspect, in general, message communication in a multiple processor system, includes, at each of a plurality of processors, maintaining multiple receive buffers and multiple send buffers for communication with another of the plurality of processors. Each send buffer is associated with a corresponding receive buffer on the same processor. Data is exchanged between a first of the processors and a second of the processors. This exchange includes, at the first processor repeatedly using multiple send buffers for passing data to the second processor including at each repetition delaying transmission from a send buffer until data is received in the corresponding receive buffer.

Aspects can include one or more of the following features.

The delaying of transmission from a send buffer includes further delaying until it is permissible to receive data in the corresponding receive buffer.

The further delaying includes delaying until it is permissible for the data received in the corresponding receive data to be overwritten by further transmissions from the second processor.

Maintaining the send and receive buffers includes registering said buffers with a communication interface.

The exchanging of the data is performed without requiring repeated exchanges between the processors for the purpose of establishing a state of a receive buffer.

The state of a receive buffer identifies when it is permissible to send data to that receive buffer.

The state of a receive buffer identifies a location of the receive buffer.

In another aspect, in general, a multiple processor communication system includes multiple processors and communication links coupling pairs of the processors. For each of the pairs of processors, multiple send buffers and multiple receive buffers are at each of the processors of the pair. Each send buffer is configured for passing data to a corresponding receive buffer at the other processor of the pair, and is associated with a corresponding receive buffer at the same processor. Each of the processors of the pairs of processors is configured to delay passing of data from a send buffer to a corresponding receive buffer at another processor until processing of data is completed for the corresponding receive buffer on the sending processor.

Aspects can have one or more of the following advantages.

Aspects can avoid the use of multiple-step rendezvous protocols, memory copies, and memory registrations that occur when a message needs to be sent.

Messages can be sent faster and thus computational problems on distributed memory parallel computers can be solved faster.

Other features and advantages of the invention are apparent from the following description, and from the claims.

DESCRIPTION

Figure 1:
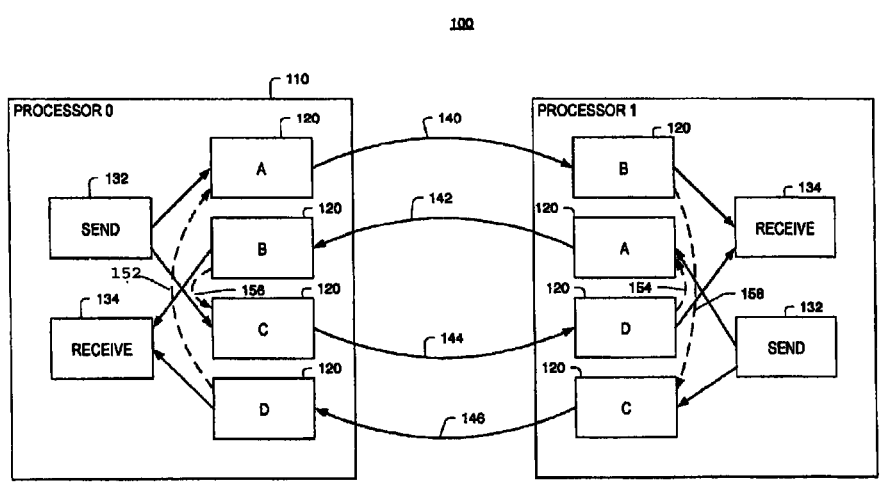
FIG. 1 is a diagram of a message passing system.

Referring to FIG. 1, a message passing system 100 includes a number of processors 110. In FIG. 1, only two processors are illustrated. In general, the approaches described here are applicable to two or more processor systems or single processor systems running two or more communicating programs. Each processor includes a number of data buffers 120. Some of the buffers are used as send buffers and some are used as receive buffers. In addition, each send buffer at one processor is associated with a particular receive buffer at the other processor. In FIG. 1, each processor 110 has four buffers, two send buffers (labeled A and C) and two receive buffers (labeled B and D). Send buffers A and C are associated with receive buffers B and D, respectively, at the other processor. In some implementations, a software application executing at each processor registers the send and receive buffers with the operating system, thereby making them available for inter-processor communication services implemented with the aid of the operating system. For example, such registration establishes a mapping between a physical address space and the virtual address space of the application, and ensures that the buffers remain at a fixed location in the physical memory.

In some example of a system 100, an iterative computation is performed such that at each iteration of the computation, data is first exchanged between the processors, a first computation is performed at each processor, and then the results of the computations are then exchanged, and further computation is performed. In some examples, the computation relates to a dynamics simulation system in which processors first exchange data related to locations of particles, each processor computes forces on particles based on the received data, the processors exchange force data for the particles, and then each processor computes updated locations for the particles using the exchanged forces. A detailed example of such an iterative exchange computation in the context of a molecular simulation system is described in copending PCT Application No. PCT/US2006/032498, "ARCHITECTURES FOR COMPUTATION OF PARTICLE INTERACTIONS."

In some examples, a send module 132 at each processor 110 has data to send to a receive module 134 at the other processor. Initially, each processor can assume that the receive buffers B and D at the other processor are free. The send module 132 alternates between sending data via send buffer A and send buffer C. Therefore, it first sends the data from buffer A to buffer B at the other processor (transmissions 140 and 142 from processor 0 and processor 1, respectively).

Before sending data via the C send buffer 120, each processor 110 waits until the data has been received in its receive buffer B, and the data has been used and the receive buffer is free to receive a further message. These timing constraints are illustrated by broken arrows 156 and 158. At that point, the sending module 132 uses the C send buffer to send a further message to the other processor (transmissions 144 and 146 from processors 0 and 1, respectively). Because these transmissions were delayed until after receive buffer B on the same processor was free, the processor receiving the transmission to its D receive buffer can allow a transmission from its A buffer to the other B buffer without the possibility of overwriting the data in the B buffer. These constraints are illustrated using broken arrows 152 and 154. This cycle continues, with the sender module 132 alternating between using send buffers A and C and the receive module 134 alternating between using receive buffers B and D.

Figure 2:
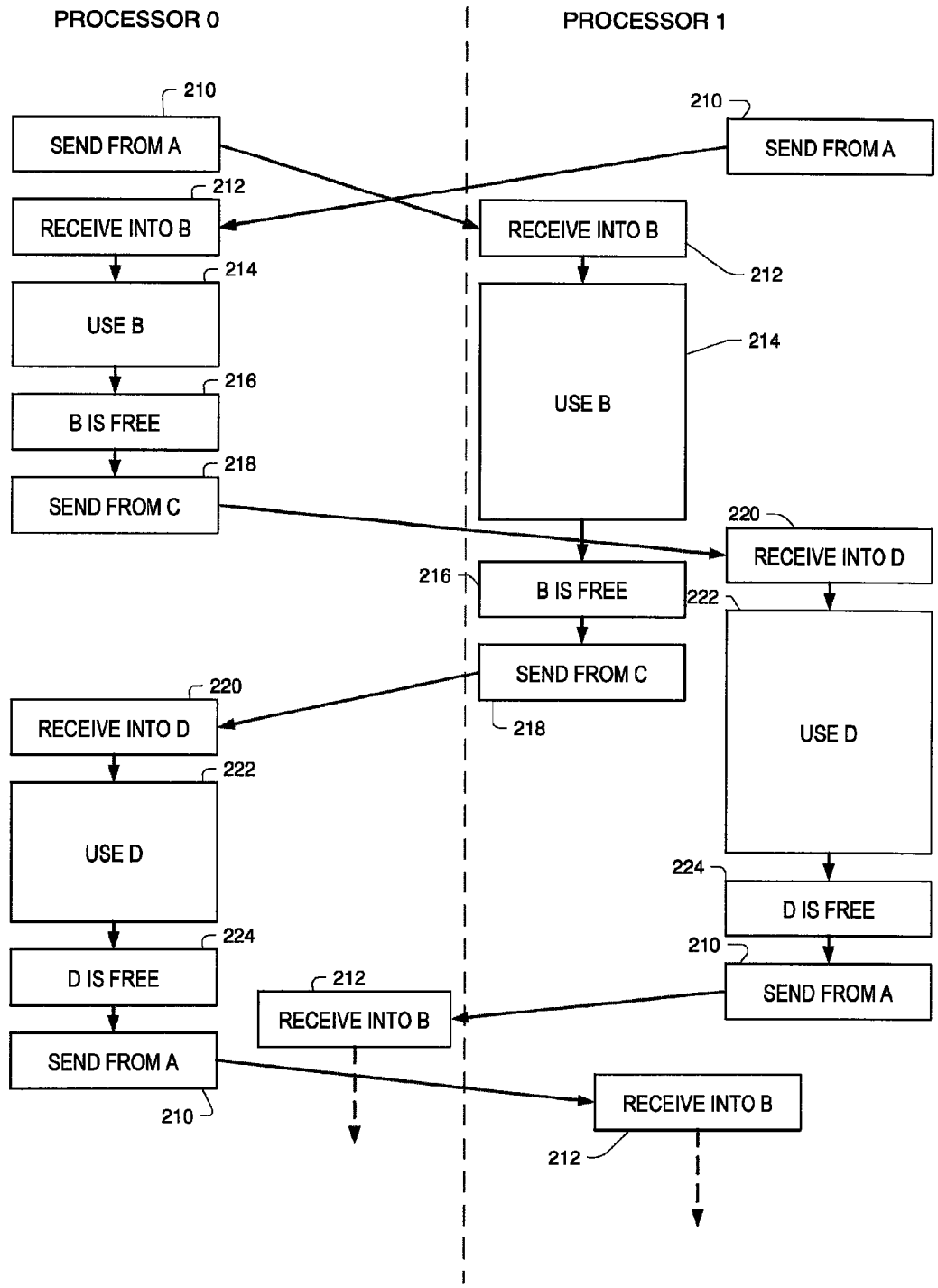
FIG. 2 is a timing diagram that illustrates exchanges between processors in a message passing system.

Referring to FIG. 2, a series of exchanges between two processors is illustrated in timing flow charts, with time generally flowing from top to bottom of the figure. Actions at processor 0 are shown on the left of the figure and actions at processor 1 are shown on the right of the figure. Initially, each processor sends from its A send buffer 120 (step 210), with the other processor receiving the sent data in its B receive buffer (step 212). After a processor receives the data in its B receive buffer (step 212) it uses the data in place (step 214). That is, the processor does not have to copy the data to an actual destination location because the processor can be guaranteed that the other processor will not send more data to that buffer until the data in that buffer is no longer needed. When the data is no longer needed, the B receive buffer is free (step 216). Note that in the example illustrated in FIG. 2, processor 1 uses receive buffer B for a longer period of time than does processor 0. After processor 0 finished using its buffer B, which is at a point that processor 1's buffer B is not yet free, processor 0 sends data from its C send buffer (step 218) which is received at the destination processor's D receive buffer (step 220). At a later point, processor 1 has completed its use of the data in buffer B, and sends data from its C send buffer (step 218). Note that at processor 1, use of buffer D can occur concurrently with transmission from buffer C, as illustrated in this example. After sending data from the C send buffers, the roles of B and C buffers are essentially taken by buffers D and A, respectively, with steps 220, 222, 224, and 210 corresponding to steps 212, 214, 216, and 218, respectively. That is, when processor 0 receives a message into buffer D (step 220), it implies that the communication from processor 0's buffer A to processor 1's buffer B has completed and that the associated send buffer A and the receive buffer B are available. The next communication steps 210 and 212 then use these buffers without needing to synchronize with the receiver, and the communication process continues with further repetitions of the steps illustrated in FIG. 2.

At initialization time, an application specifies which pairs of processors will communicate, as well as the maximum buffer sizes required for each message. Two sets of buffers (two receive and two send buffers) for each connection are allocated and registered at this time. The application uses these buffers directly, alternating between the two sets of buffers as described.

In some implementations, for example in some implementations of the system described in the copending PCT application PCT/US2006/032498 of a system using multiple general purpose computers coupled by communication links (e.g., serial communication links or a communication network), the communication techniques described herein may be used to provide communication services. In such an implementation, the receive buffers may be in a memory that is essentially loaded by direct writes from memory associated with another processor without intervention by the processor performing computation. The communication links between the processors use, for example, InfiniBand use a Verbs interface provided by Mellanox Technologies. Transfers of messages use a remote direct memory access (RDMA) write operations, which are faster than RDMA read operations with this hardware. In some implementations, each processor polls its read buffer to know when a message has arrived, since it is inefficient for RDMA writes to generate a completion signal on the receive side.

Figure 3:
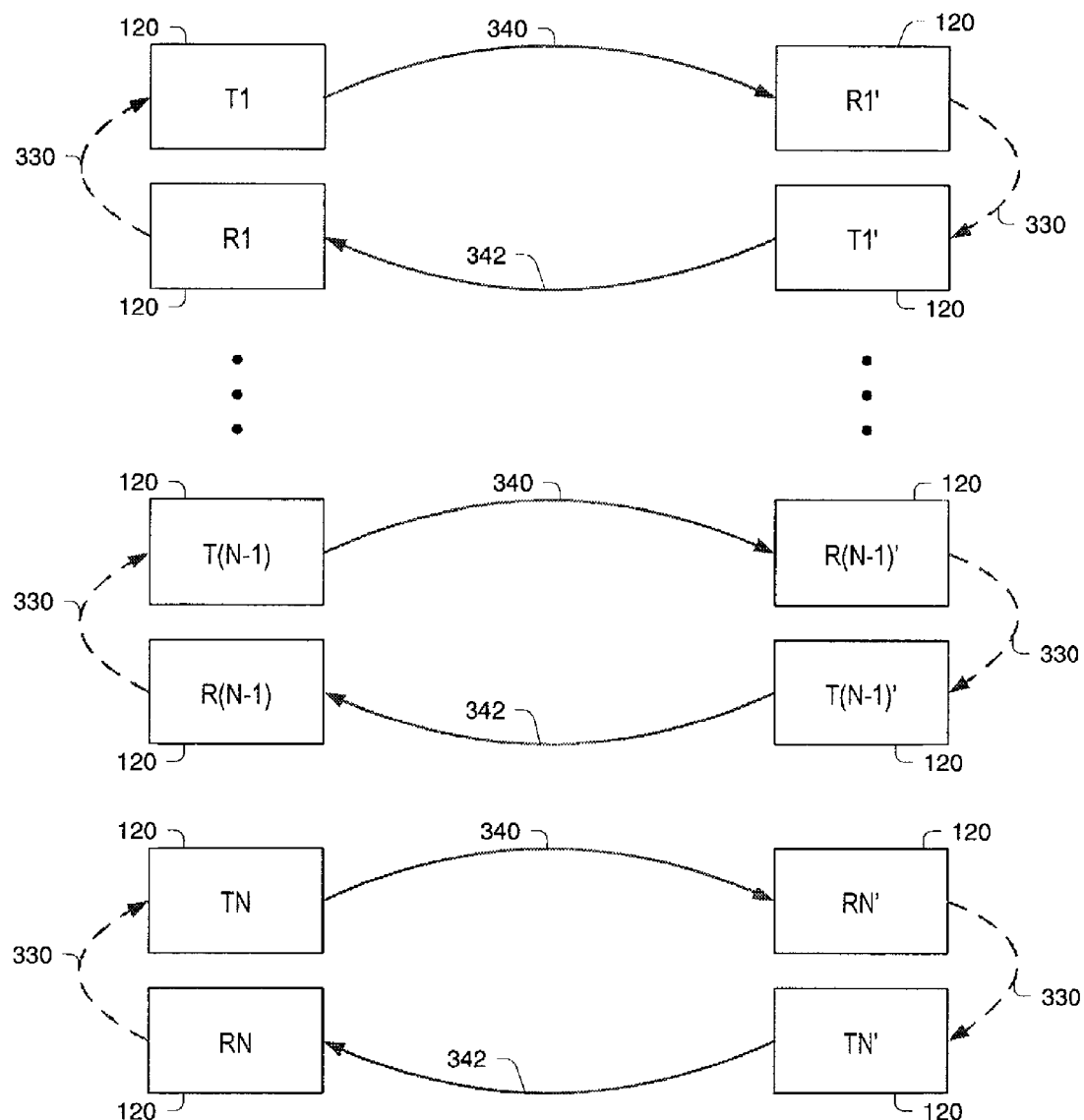
FIG. 3 is a diagram that illustrates an alternative message passing approach.

Referring to FIG. 3, an alternative embodiment uses more than two pairs of buffers 120, in the general case N pairs of buffers. For example, the approach described above can be considered as two sets of send and receive buffers 120: A and D, and C and B, which in FIG. 3 would be labeled from N=2 as T1, R1, T2, R2, respectively, on processor 0 and labeled as T2', R2', T1', R1', respectively, on processor 1. In each set, use of the send buffer (Tn) is delayed (other than initially) until after receipt and processing of the transmission into the receive buffer (Rn) of the set. In the general case, a set of send and receive buffers Tn, Rn at processor 0 are associated with Rn', Tn' at processor 1. The send module 132 at processor 0 then, after an initial set of transmissions, essentially conducts a round robin between the send buffers T1, T2, . . . , TN, T1, . . . , waiting to send using send buffer Tn until processing of data received in buffer Rn (sent from buffer Tn' at processor 1). As an initialization, processor 0 sends without waiting using buffers T1, . . . , Tk, while processor 1 sends without waiting using buffers T(k+1), . . . , TN. So in general, the ith transmission from send buffer Tn waits for the (i−1)st reception in receive buffer Rn. One advantage of this approach is that more overlap of transmission and computation times may be achievable.

In some embodiments, a corresponding pair of send and receive buffers share the same memory region (e.g., address ranges). For example, referring to FIG. 1, a pair of buffers 120 labeled A (send) and D (receive) on processor 0 uses a single memory region and a pair of buffers 120 labeled B (receive) and C (send) on processor 0 uses a different single memory region. In these embodiments, a processor may receive data, use the data in place, and send the data from the same memory region from which it just received data. Because two or more corresponding pairs of send and receive buffers are used, a buffer is guaranteed to be available to receive data when used in conjunction with the iterative exchange protocol described above.

Embodiments of approaches described above can be implemented in hardware, in software, or in a combination of hardware and software. For example, the iterative exchange protocol can be implemented in special purpose hardware, which may include processor or controller elements that make use of instructions that cause the elements to perform steps of the protocol. The approaches are applicable to a variety of interconnections of processors (or more generally processing nodes), including shared communication media, as well as dedicated communication media, for example, with a dedicated medium for each pair of communicating processors.

Other embodiments are within the scope of the following claims.

What is claimed is:

1. A method for message communication in a multiple processor system, the method comprising: at each of a plurality of processors, maintaining multiple receive buffers and multiple send buffers for communication with another of the plurality of processors, each send buffer being associated with a corresponding receive buffer on the same processor; and exchanging data between a first of the processors and a second of the processors, including, at the first processor repeatedly using multiple send buffers for passing data to the second processor including at each repetition delaying transmission from a send buffer until data is received in the corresponding receive buffer, wherein delaying transmission from a send buffer includes further delaying until it is permissible to receive data in the corresponding receive buffer, and wherein further delaying includes delaying until it is permissible for the data received in the corresponding receive buffer to be overwritten by further transmissions from the second processor.

2. The method of claim 1, wherein maintaining the send and receive buffers includes registering said buffers with a communication interface.

3. The method of claim 1, wherein the exchanging of the data is performed without requiring repeated exchanges between the processors for the purpose of establishing a state of a receive buffer.

4. The method of claim 3, wherein the state of a receive buffer identifies when it is permissible to send data to that receive buffer.

5. The method of claim 3, wherein the state of a receive buffer identifies a location of the receive buffer.

6. The method of claim 1, wherein each send buffer and its associated corresponding receive buffer share a memory region.

7. The method of claim 6, further comprising, at each repetition, receiving data in a receive buffer, processing the data in the memory region shared with the corresponding send buffer, and sending the processed data from said send buffer.

8. Non-transitory computer readable media comprising software having instructions for causing a processing system to: at each of a plurality of processors, maintain multiple receive buffers and multiple send buffers for communication with another of the plurality of processors, each send buffer being associated with a corresponding receive buffer on the same processor; and exchange data between a first of the processors and a second of the processors, including, at the first processor repeatedly using multiple send buffers for passing data to the second processor including at each repetition delaying transmission from a send buffer until data is received in the corresponding receive buffer, wherein delaying transmission from a send buffer includes further delaying until it is permissible to receive data in the corresponding receive buffer, and wherein further delaying includes delaying until it is permissible for the data received in the corresponding receive buffer to be overwritten by further transmissions from the second processor.

9. A multiple processor communication system comprising: a plurality of processors; communication links coupling pairs of the processors; and for each of the pairs of processors, plural send buffers and plural receive buffers at each of the processors of the pair, each send buffer being configured for passing data to a corresponding receive buffer at the other processor of the pair, and associated with a corresponding receive buffer at the same processor; wherein each of the processors of the pairs of processors is configured to delay passing of data from a send buffer to a corresponding receive buffer at another processor until processing of data passed to the corresponding receive buffer on that processor, wherein the delay in passing of data from a send buffer to a corresponding receive buffer at another processor includes further delaying until it is permissible to receive data in the corresponding receive buffer on that processor, and wherein further delaying includes delaying until it is permissible for the data received in the corresponding receive buffer to be overwritten by further transmissions from the other processor.

10. A method for message communication in a multiple processor system, the method comprising, at each of a plurality of processors, maintaining multiple receive buffers and multiple send buffers for communication with another of the plurality of processors, each send buffer being associated with a corresponding receive buffer on the same processor; and exchanging data between a first of the processors and a second of the processors, including, at the first processor repeatedly using multiple send buffers for passing data to the second processor including at each repetition delaying transmission from a send buffer until data is received in the corresponding receive buffer, wherein the exchanging of the data is performed without requiring repeated exchanges between the processors for the purpose of establishing a state of a receive buffer, and wherein the state of a receive buffer identifies when it is permissible to send data to that receive buffer.

11. Non-transitory computer readable media comprising software having instructions for causing a processing system to, at each of a plurality of processors, maintain multiple receive buffers and multiple send buffers for communication with another of the plurality of processors, each send buffer being associated with a corresponding receive buffer on the same processor; and instructions for causing a processing system to exchange data between a first of the processors and a second of the processors, including, at the first processor repeatedly using multiple send buffers for passing data to the second processor including at each repetition delaying transmission from a send buffer until data is received in the corresponding receive buffer, wherein the instructions for causing a processing system to exchange data comprise instructions for performing exchange of the data without requiring repeated exchanges between the processors for the purpose of establishing a state of a receive buffer, and wherein the state of a receive buffer identifies when it is permissible to send data to that receive buffer.

12. A multiple processor communication system comprising: a plurality of processors; communication links coupling pairs of the processors; and for each of the pairs of processors, plural send buffers and plural receive buffers at each of the processors of the pair, each send buffer being configured for passing data to a corresponding receive buffer at the other processor of the pair, and associated with a corresponding receive buffer at the same processor; wherein each of the processors of the pairs of processors is configured to delay passing of data from a send buffer to a corresponding receive buffer at another processor until processing of data passed to the corresponding receive buffer on that processor; wherein each of the processors of the pairs of processors is configured to perform exchanging of the data without requiring repeated exchanges between the processors for the purpose of establishing a state of a receive buffer, and wherein the state of a receive buffer identifies when it is permissible to send data to that receive buffer.

13. A method for message communication in a multiple processor system, the method comprising, at each of a plurality of processors, maintaining multiple receive buffers and multiple send buffers for communication with another of the plurality of processors, each send buffer being associated with a corresponding receive buffer on the same processor; and exchanging data between a first of the processors and a second of the processors, including, at the first processor repeatedly using multiple send buffers for passing data to the second processor including at each repetition delaying transmission from a send buffer until data is received in the corresponding receive buffer, wherein the exchanging of the data is performed without requiring repeated exchanges between the processors for the purpose of establishing a state of a receive buffer, and wherein the state of a receive buffer identifies a location of the receive buffer.

14. Non-transitory computer readable media comprising software having instructions for causing a processing system to, at each of a plurality of processors, maintain multiple receive buffers and multiple send buffers for communication with another of the plurality of processors, each send buffer being associated with a corresponding receive buffer on the same processor; and instructions for causing a processing system to exchange data between a first of the processors and a second of the processors, including, at the first processor repeatedly using multiple send buffers for passing data to the second processor including at each repetition delaying transmission from a send buffer until data is received in the corresponding receive buffer, wherein the instructions for causing a processing system to exchange data comprise instructions for performing exchange of the data without requiring repeated exchanges between the processors for the purpose of establishing a state of a receive buffer, and wherein the state of a receive buffer identifies a location of the receive buffer.

15. A multiple processor communication system comprising: a plurality of processors; communication links coupling pairs of the processors; and for each of the pairs of processors, plural send buffers and plural receive buffers at each of the processors of the pair, each send buffer being configured for passing data to a corresponding receive buffer at the other processor of the pair, and associated with a corresponding receive buffer at the same processor; wherein each of the processors of the pairs of processors is configured to delay passing of data from a send buffer to a corresponding receive buffer at another processor until processing of data passed to the corresponding receive buffer on that processor; wherein each of the processors is configured to perform exchanging of the data without requiring repeated exchanges between the processors for the purpose of establishing a state of a receive buffer, and wherein the state of a receive buffer identifies a location of the receive buffer.

* * * * *